United States Patent
Boshra et al.

(10) Patent No.: US 9,292,728 B2
(45) Date of Patent: Mar. 22, 2016

(54) ELECTRONIC DEVICE FOR REALLOCATING FINGER BIOMETRIC TEMPLATE NODES IN A SET MEMORY SPACE AND RELATED METHODS

(71) Applicant: APPLE INC., Cupertino, CA (US)

(72) Inventors: Michael Boshra, Melbourne, FL (US); Craig A. Marciniak, Cupertino, CA (US); William M. Vieta, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 187 days.

(21) Appl. No.: 14/291,900

(22) Filed: May 30, 2014

(65) Prior Publication Data

US 2015/0347810 A1    Dec. 3, 2015

(51) Int. Cl.
*G06K 9/00* (2006.01)
*G06F 17/30* (2006.01)

(52) U.S. Cl.
CPC ...... *G06K 9/00033* (2013.01); *G06F 17/30247* (2013.01)

(58) Field of Classification Search
CPC .............. G06K 9/00033; G06K 17/30247
See application file for complete search history.

(56) References Cited

U.S. PATENT DOCUMENTS

| | | | |
|---|---|---|---|
| 5,953,441 A | 9/1999 | Setlak | |
| 5,982,914 A | 11/1999 | Lee et al. | |
| 6,002,815 A * | 12/1999 | Immega | H04N 1/0473 235/439 |
| 6,289,114 B1 | 9/2001 | Mainguet | |
| 6,317,508 B1 | 11/2001 | Kramer et al. | |
| 6,333,989 B1 | 12/2001 | Borza | |
| 6,459,804 B2 | 10/2002 | Mainguet | |
| 6,546,122 B1 | 4/2003 | Russo | |
| 6,795,569 B1 | 9/2004 | Setlak | |
| 7,203,347 B2 * | 4/2007 | Hamid | G06K 9/0002 340/5.53 |
| 7,361,919 B2 | 4/2008 | Setlak | |
| 7,369,688 B2 | 5/2008 | Ser et al. | |
| 7,599,530 B2 | 10/2009 | Boshra | |
| 7,616,787 B2 | 11/2009 | Boshra | |
| 7,787,667 B2 | 8/2010 | Boshra | |
| 8,145,916 B2 | 3/2012 | Boshra et al. | |
| 8,275,178 B2 | 9/2012 | Boshra | |
| 8,571,276 B2 | 10/2013 | Vitt et al. | |
| 8,611,618 B2 | 12/2013 | Kwon et al. | |

(Continued)

FOREIGN PATENT DOCUMENTS

| | | |
|---|---|---|
| EP | 0778541 B1 | 5/2000 |
| WO | 98/46114 | 10/1998 |
| WO | 99/06942 | 2/1999 |

*Primary Examiner* — Samir Ahmed
(74) *Attorney, Agent, or Firm* — Allen, Dyer, Doppelt, Milbrath & Gilchrist, P.A.

(57) ABSTRACT

An electronic device may include a finger biometric sensor, a memory, and a processor capable of generating a respective finger biometric template node for each finger positioning adjacent the finger biometric sensor. The processor may also be capable of allocating a set space of the memory to store a total number of finger biometric template nodes based upon a first number of fingers and with each finger having a first number of finger biometric template nodes associated therewith. In addition, the processor may reallocate the set space of the memory to store the total number of finger biometric template nodes but with a second number of finger biometric template nodes associated with at least one finger, with the second number of finger biometric template nodes being different than the first number of finger biometric template nodes.

27 Claims, 6 Drawing Sheets

(56) References Cited

U.S. PATENT DOCUMENTS

| | | |
|---|---|---|
| 2008/0013805 A1 | 1/2008 | Sengupta et al. |
| 2009/0067685 A1 | 3/2009 | Boshra et al. |
| 2009/0067686 A1 | 3/2009 | Boshra et al. |
| 2009/0067687 A1 | 3/2009 | Boshra et al. |
| 2009/0067688 A1 | 3/2009 | Boshra et al. |
| 2009/0070593 A1 | 3/2009 | Boshra et al. |
| 2010/0080425 A1* | 4/2010 | Bebis ............... G06K 9/00073 382/125 |
| 2011/0138187 A1* | 6/2011 | Kaga ..................... G06F 21/32 713/186 |
| 2011/0182486 A1* | 7/2011 | Valfridsson ........ G06K 9/00026 382/124 |
| 2011/0246503 A1* | 10/2011 | Bender ............ G06F 17/30306 707/769 |
| 2011/0317882 A1* | 12/2011 | Muazam ........... G06K 9/00087 382/117 |
| 2013/0278383 A1 | 10/2013 | Boshra |
| 2013/0279768 A1 | 10/2013 | Boshra |
| 2014/0003681 A1 | 1/2014 | Wright et al. |

\* cited by examiner

ELECTRONIC DEVICE FOR REALLOCATING FINGER BIOMETRIC TEMPLATE NODES IN A SET MEMORY SPACE AND RELATED METHODS

FIELD OF THE INVENTION

The present invention relates to the field of electronics, and, more particularly, to the field of finger sensors.

BACKGROUND

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A fingerprint sensor may be particularly advantageous for verification and/or authentication in an electronic device, and more particularly, a portable device, for example. Such a fingerprint sensor may be carried by the housing of a portable electronic device, for example, and may be sized to sense a fingerprint from a single-finger.

Where a fingerprint sensor is integrated into an electronic device or host device, for example, as noted above, it may be desirable to more quickly perform authentication, particularly while performing another task or an application on the electronic device and based upon different finger conditions. In other words, it may be particularly undesirable to have a user wait while a fingerprint is processed for authentication. Performing a fingerprint authentication with a reduced user delay and while maintaining a desired level of security may be increasingly difficult when a fingerprint sensor is integrated in a host device, such as a personal computer or cellphone.

SUMMARY

An electronic device may include a finger biometric sensor, a memory, and a processor. The processor may be capable of generating a respective finger biometric template node for each finger positioning adjacent the finger biometric sensor, and allocating a set space of the memory to store a total number of finger biometric template nodes based upon a first number of fingers and with each finger having a first number of finger biometric template nodes associated therewith. The processor may also be capable of reallocating the set space of the memory to store the total number of finger biometric template nodes but with a second number of finger biometric template nodes associated with at least one finger. The second number of finger biometric template nodes is different than the first number of finger biometric template nodes.

The processor may be capable of storing the finger biometric template nodes based upon the reallocating. The processor may be capable of performing a finger match operation based upon the stored finger biometric template nodes, for example. The processor may be capable of ranking stored finger biometric template nodes and replacing in the memory a stored biometric template node having a lower ranking with a new finger biometric template node having a higher ranking.

The processor may be capable of ranking based upon at least one of a specific finger area, node age, frequency of node usage, and frequency of associated finger biometric template usage, for example. The processor may be capable of storing at least one newer finger biometric template node for each finger.

The processor may be capable of determining the second number of finger biometric template nodes based upon at least one of a finger size, a finger positional variability, and a finger frequency of usage. The processor may be capable of reallocating also with a second number of fingers different than the first number of fingers. The electronic device may further include at least one wireless transceiver coupled to the processor.

A method aspect is directed to a method for finger biometric processing in an electronic device comprising a finger biometric sensor. The method includes operating a processor and associated memory of the electronic device for generating a respective finger biometric template node for each finger positioning adjacent the finger biometric sensor and allocating a set space of the memory to store a total number of finger biometric template nodes based upon a first number of fingers and with each finger having a first number of finger biometric template nodes associated therewith. The method may also include operating the processor and the associated memory for reallocating the set space of the memory to store the total number of finger biometric template nodes but with a second number of finger biometric template nodes associated with at least one finger. The second number of finger biometric template nodes may be different than the first number of finger biometric template nodes.

A non-transitory computer readable medium for use with a finger biometric sensor and which when executed on a processor having an associated memory may performs steps that may include generating a respective finger biometric template node for each finger positioning adjacent the finger biometric sensor, and allocating a set space of the memory to store a total number of finger biometric template nodes based upon a first number of fingers and with each finger having a first number of finger biometric template nodes associated therewith. The steps may also include reallocating the set space of the memory to store the total number of finger biometric template nodes but with a second number of finger biometric template nodes associated with at least one finger. The second number of finger biometric template nodes may be different than the first number of finger biometric template nodes.

DETAILED DESCRIPTION

The present invention will now be described more fully hereinafter with reference to the accompanying drawings, in which preferred embodiments of the invention are shown.

This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
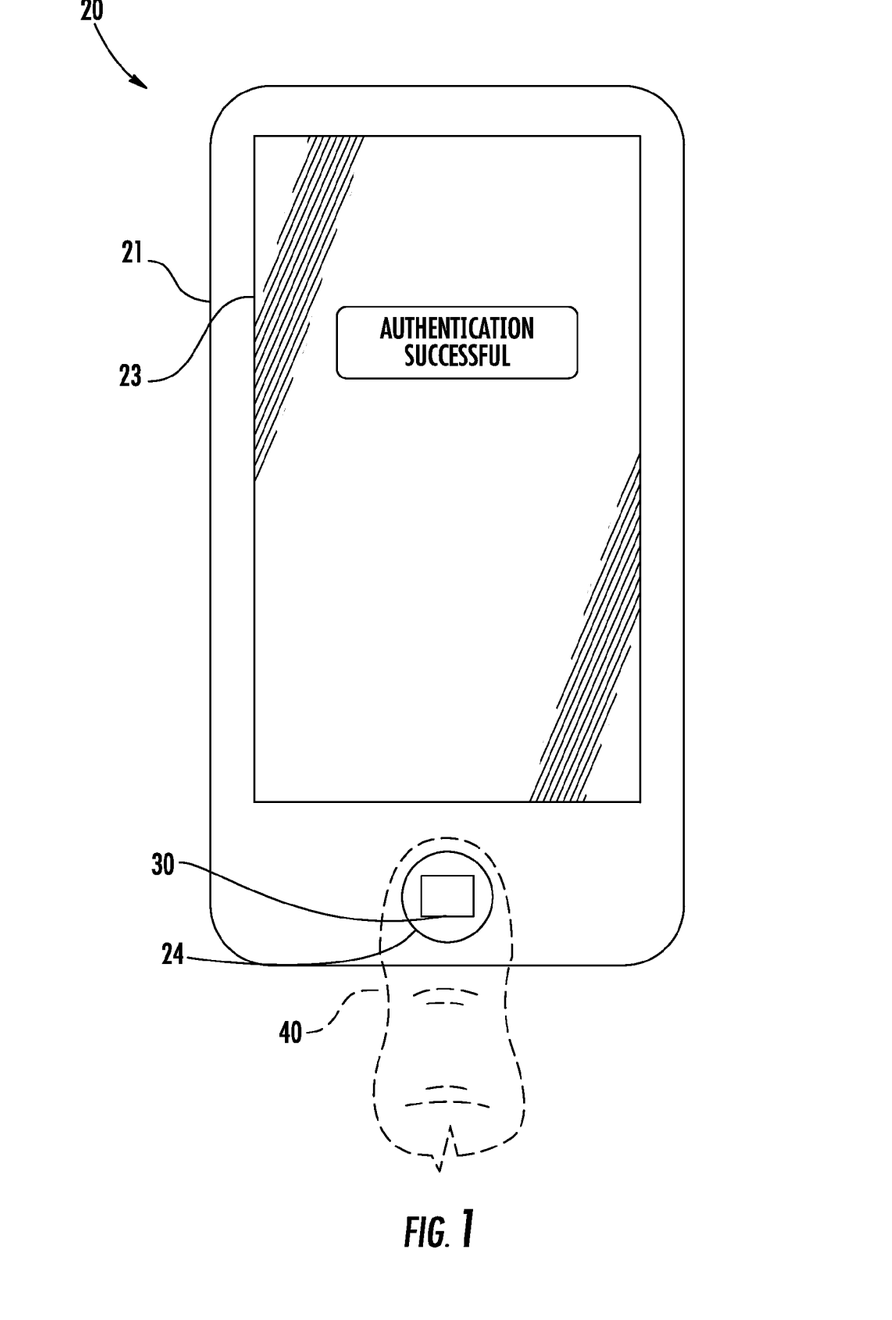
FIG. 1 is a plan view of an electronic device according to an embodiment.
Figure 2:
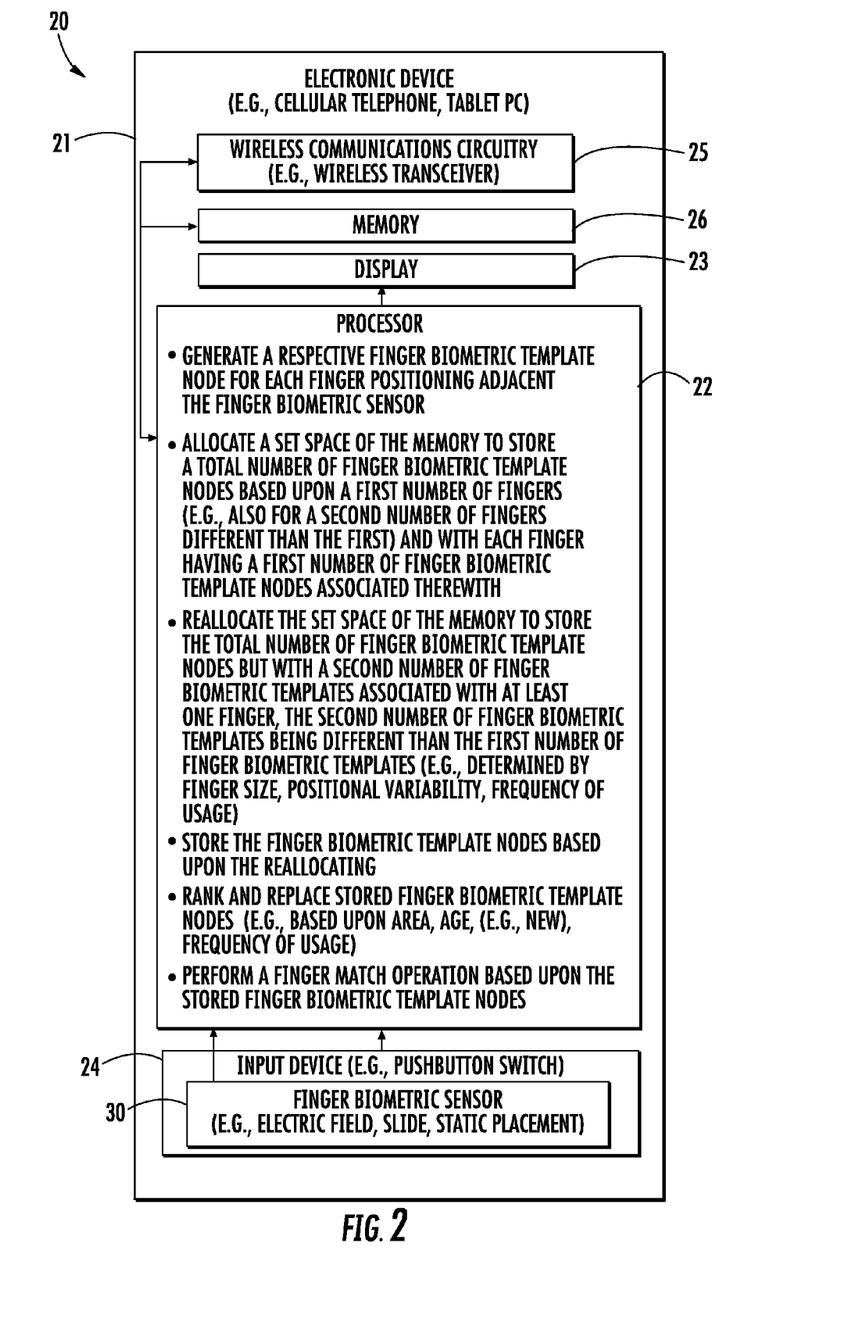
FIG. 2 is a schematic block diagram of an electronic device according to an embodiment.

Referring initially to FIGS. 1 and 2, an electronic device 20 is now described. The electronic device 20 illustratively includes a portable housing 21 and a processor 22 carried by the portable housing. The electronic device 20 is illustratively a mobile wireless communications device, for example, a cellular telephone. The electronic device 20 may be another type of electronic device, for example, a tablet computer, laptop computer, etc.

A wireless transceiver 25 is also carried within the housing 21 and coupled to the processor 22. The wireless transceiver 25 cooperates with the processor 22 to perform at least one wireless communications function, for example, for voice and/or data. In some embodiments, the electronic device 20 may not include a wireless transceiver 25 or other wireless communications circuitry.

A display 23 is also carried by the portable housing 21 and is coupled to the processor 22. The display 23 may be a liquid crystal display (LCD), for example, or may be another type of display, as will be appreciated by those skilled in the art. A memory 26 is also coupled to the processor 22. The memory 26 is for storing finger matching biometric data and a subset of the finger matching biometric data, as will be described in further detail below. As will be appreciated by those skilled in the art, the memory 26 may be device memory, host memory, or shared memory.

A finger-operated user input device 24, illustratively in the form of a pushbutton switch, is also carried by the portable housing 21 and is coupled to the processor 22. The pushbutton switch 24 cooperates with the processor 22 to perform a device function in response to the pushbutton switch. For example, a device function may include a powering on or off of the electronic device 20, initiating communication via the wireless communications circuitry 25, and/or performing a menu function.

More particularly, with respect to a menu function, the processor 22 may change the display 23 to show a menu of available applications based upon pressing of the pushbutton switch 24. In other words, the pushbutton switch 24 may be a home switch or button, or key. Of course, other device functions may be performed based upon the pushbutton switch 24, for example, switching to a user-interface unlocked mode. In some embodiments, the finger-operated user input device 24 may be a different type of finger-operated user input device, for example, forming part of a touch screen display. Other or additional finger-operated user input devices may be carried by the portable housing 21.

A finger biometric sensor 30 is carried by the pushbutton switch 24 to sense a user's finger 40 or an object placed adjacent the finger biometric sensor. The finger biometric sensor 30 is carried by the pushbutton switch 24 so that when a user contacts and/or presses downward on the pushbutton switch, data from the user's finger 40 is acquired, for example, for finger matching and/or spoof detection, as will be appreciated by those skilled in the art. In other words, the finger biometric sensor 30 may be responsive to static contact or placement of the user's finger 40 or object. Of course, in other embodiments, for example, where the finger biometric sensor 30 is not carried by a pushbutton switch, the finger biometric sensor may be a slide sensor and may be responsive to sliding contact, or the finger biometric sensor may be a standalone static placement sensor. The finger biometric sensor 30 may also be a combination slide/static placement sensor and be responsive to both static placement and sliding contact with the user's finger 40.

Figure 3:
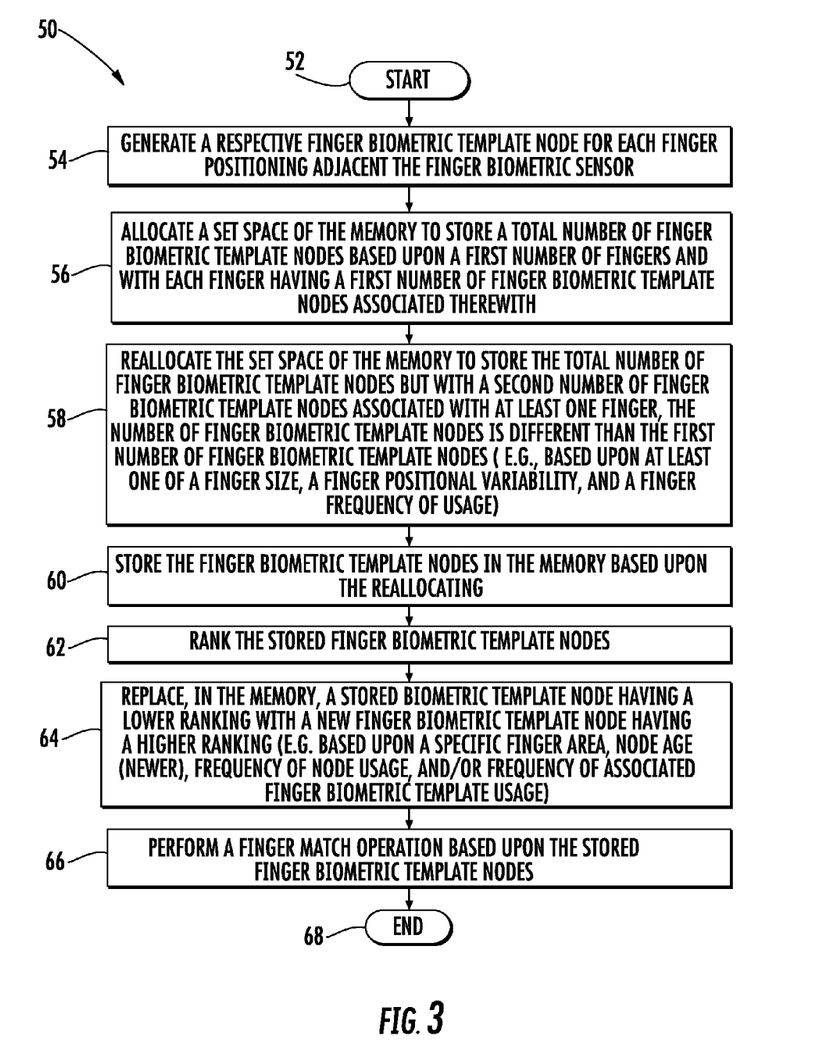
FIG. 3 is a flow diagram illustrating operation of he electronic device of FIG. 2.

Referring now additionally to the flowchart 50 in FIG. 3, operation of the electronic device 20 is now described. Beginning at Block 52 the processor 22, at Block 54, generates a respective finger biometric template node for each finger positioning adjacent the finger biometric sensor. For example, finger biometric template nodes may be generated for different fingers of the same user or different users. As will be appreciated by those skilled in the art, a node may be considered a collection of data points for a given region or area of a user's finger and may include ridge-flow data and/or minutiae points.

At Block 56, the processor 22 allocates a set space of the memory 26 to store a total number of finger biometric template nodes based upon a first number of fingers and with each finger having a first number of finger biometric template nodes associated therewith. For example, a given finger may have a total of 18 finger biometric template nodes associated therewith in the memory 26, which is capable of storing 90 nodes (thus there are in this example, 5 finger biometric templates).

The processor 22 reallocates the set space of the memory to store the total number of finger biometric template nodes but with a second number of finger biometric template nodes associated with at least one finger at Block 58. The second number of finger biometric template nodes is different than the first number of finger biometric template nodes. The processor 22 may determine the second number of finger biometric template nodes based upon at least one of a finger size, a finger positional variability, and a finger frequency of usage, for example. Of course, the processor 22 may determine the second number based upon other and/or additional factors, either alone or in combination. With respect to the example sizes described above, after reallocation, there may be 4 finger biometric templates instead of 5, one of finger biometric templates having 36 nodes associated therewith, but the total number of nodes remains at 90.

At Block 60, the processor 22 stores the finger biometric template nodes in the memory 26 based upon the reallocating. The processor 22 ranks the stored finger biometric template nodes (Block 62), and replaces, in the memory 26, a stored biometric template node having a lower ranking with a new finger biometric template node having a higher ranking (Block 64). It will be appreciated by those skilled in the art that the ranking may be performed by the processor 22 before or after being stored in the memory 26 or during the storage thereof.

The processor 22 may rank the stored finger biometric template nodes based upon a specific finger area, node age, frequency of node usage, and/or frequency of associated finger biometric template usage. For example, the processor 22 may store at least one newer finger biometric template node for each finger. Of course, the processor 22 can rank the stored finger biometric template nodes based upon other and/or additional factors, either alone or in combination, for example with the factors listed above.

While the above has been described with respect to a first number of fingers, the processor 22 may reallocate with a second number of fingers different than the first number of finger. For example, the processor 22 may reallocate with more or less fingers than were originally allocated and reallocated. This may occur when fingers are added or removed, for example, storing finger biometric template nodes associated with 3 fingers instead of 5 fingers or vice versa. By adding a finger, for example, an additional template would be generated and allocated in memory, leaving the previously stored finger biometric templates with less node capacity. Thus, the set space of the memory is reallocated. A similar process may occur when a finger biometric template is removed.

The processor, at Block 66, performs a finger match operation based upon the stored finger biometric template nodes. The method ends at Block 68.

As will be appreciated by those skilled in the art, prior art finger template management may be limited in that each finger biometric template is typically allocated memory of a fixed size and each finger biometric template has its own data structure. Thus, the fixed size allocation may not address finger size (e.g. a thumb may use more memory space than an index finger), positional variability (e.g., a finger involving a tip and cores usage may use more space than that involving a tip only), a change in fingerprint pattern (e.g. a finger that undergoes a condition change may use more memory space), frequency of usage (e.g. more frequently used fingers should generally be given more memory space), and partial enrollment (e.g. if the number of enrolled fingers is less than a maximum, then capacity is available and memory space is wasted).

The reallocation of the finger biometric template nodes may be particularly advantageous for adapting to finger size. In particular, more finger biometric template nodes may be allocated to a larger finger. Additionally, the more finger biometric template nodes that are associated with a given finger, the better performance in terms of accuracy and speed.

Changing finger conditions may also be addressed by reallocation of the set space of the memory 26. Finger conditions change over time, for example from dry to moist, and by reallocating the set space of the memory 26, for example, based upon age, may increasingly account for these changing finger conditions. Accordingly, a more accurate and quicker finger match operation may be performed.

Figure 4A:
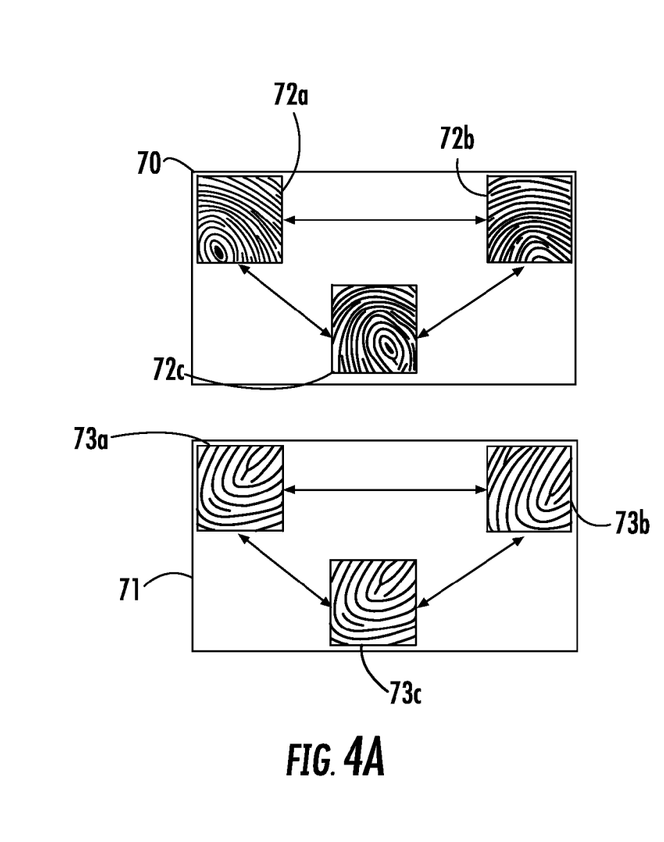
FIGS. 4a and 4b are schematic diagrams illustrating exemplary reallocation of the set space of the memory in accordance with an embodiment.
Figure 4B:
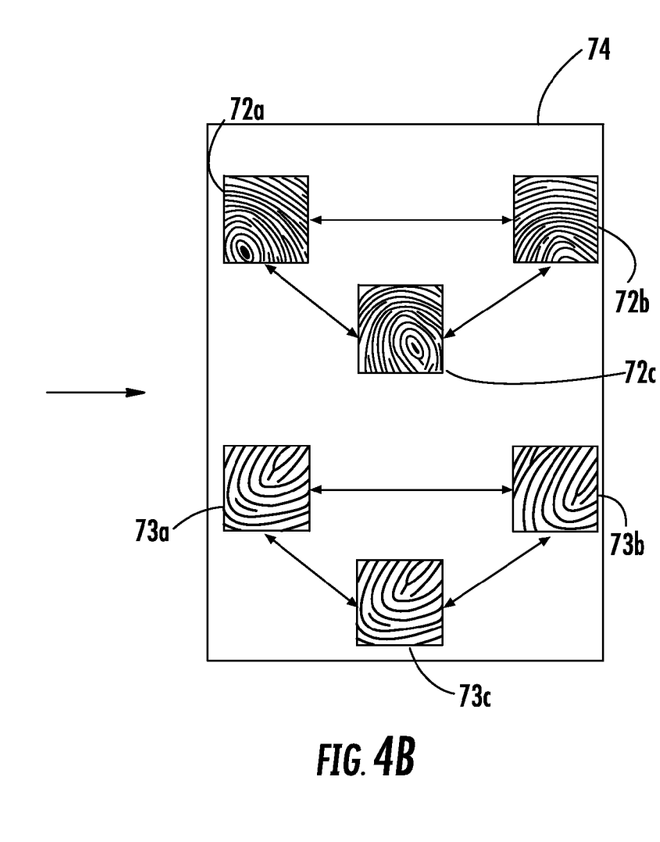

Referring now to FIGS. 4*a* and 4*b*, an exemplary reallocation of the set space of the memory 26 to store the total number of finger biometric template nodes is illustrated. The diagram in FIG. 4*a* illustrates two finger biometric templates 70, 71 each having three nodes 72*a*-72*c*, 73*a*-73*c*, respectively. As will be appreciated by those skilled in the art, as illustrated, the edges correspond to alignment information between incident nodes. FIG. 4*b* illustrates a single finger biometric template 74 having the six total finger biometric nodes therein. In other words, the generally fixed template size of three nodes has been reallocated to a single biometric template having the six finger biometric nodes 72*a*-72*c*, 73*a*-73*c*. It should be noted that the total number of finger biometric template nodes in the template 74 is the same as the total of the finger biometric templates 70, 71.

Figure 5A:
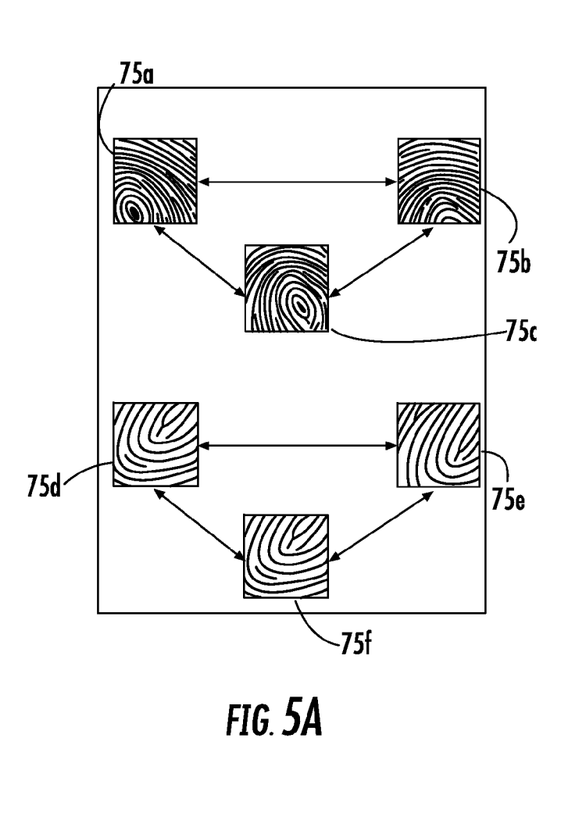
FIGS. 5a and 5b are schematic diagrams illustrating another exemplary reallocation of the set space of the memory in accordance with an embodiment.
Figure 5B:
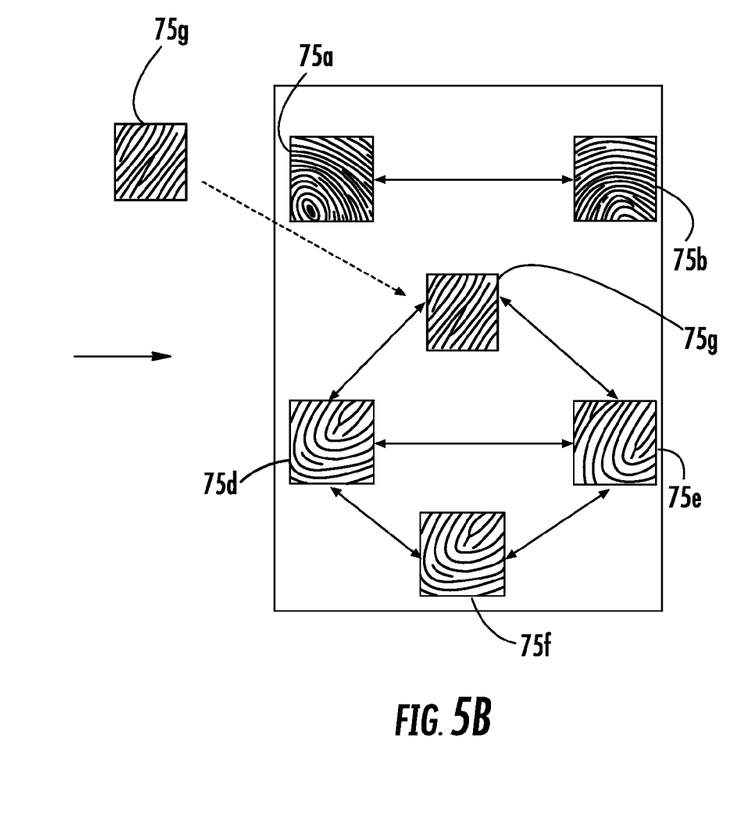

Referring now to FIGS. 5*a* and 5*b*, another exemplary reallocation of the set space of the memory 26 to store the total number of finger biometric template nodes is illustrated. The diagram in FIG. 5*a* illustrates a finger biometric six nodes 75*a*-75*f*, nodes 75*a*-75*c* being associated and nodes 75*d*-75*f* being associated. Node 75*c* is the least ranked node. A match image or finger biometric template node 75*g*, for example, may be generated, which is more closely associated with the finger biometric template nodes 75*d*-75*f*. The memory 26 is reallocated so that finger biometric template nodes 75*d*-75*g* are associated and finger biometric template nodes 75*a*, 75*b* are associated.

Figure 6A:
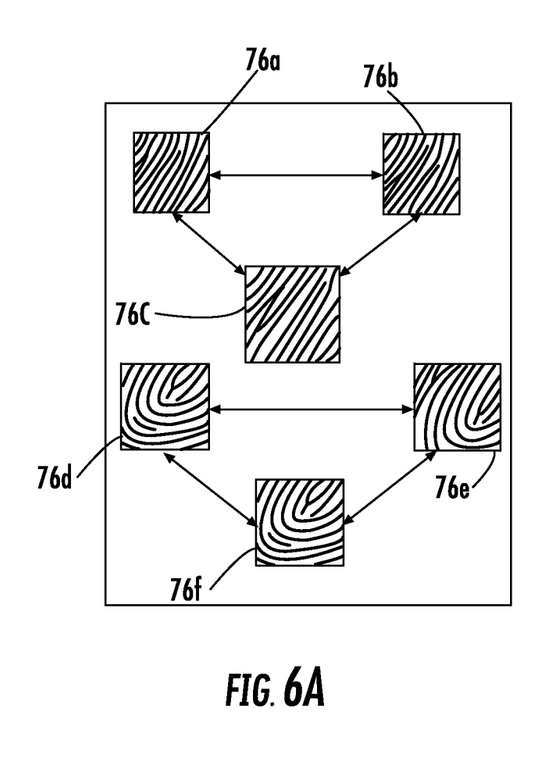
FIGS. 6a and 6b are schematic diagrams illustrating another exemplary reallocation of the set space of the memory in accordance with an embodiment.
Figure 6B:
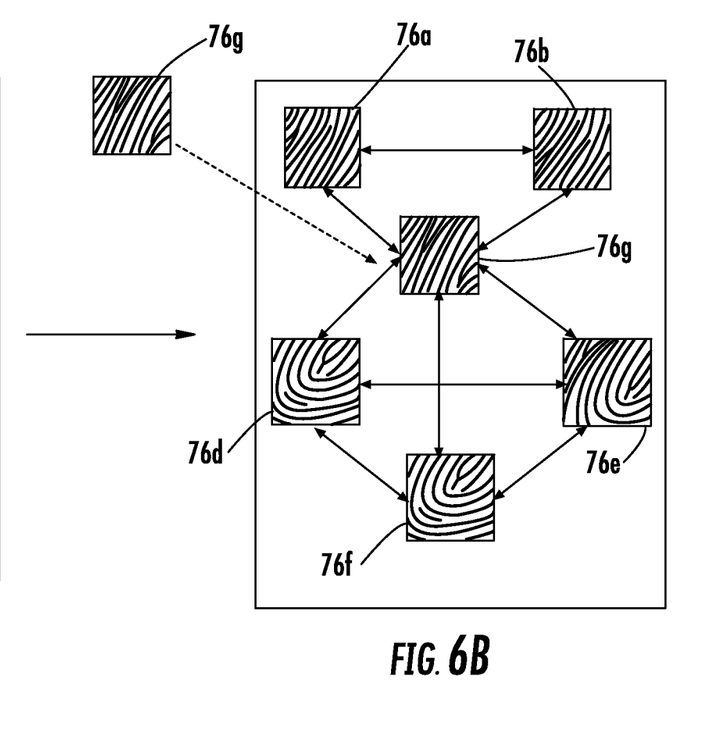

Referring now to FIGS. 6*a* and 6*b*, yet another exemplary reallocation of the set space of the memory 26 to store the total number of finger biometric template nodes is illustrated. The diagram in FIG. 6*a* illustrates a finger biometric six nodes 76*a*-76*f*, nodes 76*a*-76*c* being associated and nodes 76*d*-76*f* being associated. A match image or finger biometric template node 76*g*, for example, may be generated, which is associated with all the finger biometric template nodes 76*a*-76*f*. The memory 26 is reallocated so that finger biometric template nodes 76*a*-76*g* are associated. Finger biometric template node 76*c* is deleted. This reallocation scheme may be particularly advantageous for managing duplicate finger biometric template nodes.

A method aspect is directed to a method for finger biometric processing in an electronic device 20 that includes a finger biometric sensor 30. The method includes operating a processor 22 and associated memory 26 of the electronic device 20 for generating a respective finger biometric template node for each finger positioning adjacent the finger biometric sensor, and allocating a set space of the memory to store a total number of finger biometric template nodes based upon a first number of fingers and with each finger having a first number of finger biometric template nodes associated therewith. The method also includes operating the processor 22 and the associated electronic device 20 for reallocating the set space of the memory 26 to store the total number of finger biometric template nodes but with a second number of finger biometric template nodes associated with at least one finger. The second number of finger biometric template nodes is different than the first number of finger biometric template nodes.

Another aspect is directed to a non-transitory computer readable medium for use with a finger biometric sensor 30 and which when executed on a processor 22 having an associated memory 26 performs steps that include generating a respective finger biometric template node for each finger positioning adjacent the finger biometric sensor. The steps also include allocating a set space of the memory to store a total number of finger biometric template nodes based upon a first number of fingers and with each finger having a first number of finger biometric template nodes associated therewith, reallocating the set space of the memory to store the total number of finger biometric template nodes but with a second number of finger biometric template nodes associated with at least one finger. The second number of finger biometric template nodes is different than the first number of finger biometric template nodes.

It will be appreciated by those skilled in the art that the reallocating of the set space of the memory 26 may occur at any time and any number of times. Thus, the reallocation may be considered a dynamic reallocation. For example, the set space of the memory 26 may be reallocated each time a finger biometric template node is generated, at a time interval or after a threshold time period, either fixed or variable, and/or randomly. The time threshold may be set by any number of factors, for example, usage. Of course the time threshold may be set based upon other and/or additional factors, and the set space of the memory 26 may also be reallocated based upon other factors and/or at other times, as will be appreciated by those skilled in the art.

Many modifications and other embodiments will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
   a finger biometric sensor;

a memory; and a processor configured to generate a respective finger biometric template node for each finger positioning adjacent the finger biometric sensor, allocate a set space of the memory to store a total number of finger biometric template nodes based upon a first number of fingers and with each finger having a first number of finger biometric template nodes associated therewith, and reallocate the set space of the memory to store the total number of finger biometric template nodes but with a second number of finger biometric template nodes associated with at least one finger, the second number of finger biometric template nodes being different than the first number of finger biometric template nodes.

2. The electronic device according to claim 1 wherein the processor is configured to store the finger biometric template nodes based upon the reallocating.

3. The electronic device according to claim 2 wherein the processor is configured to perform a finger match operation based upon the stored finger biometric template nodes.

4. The electronic device according to claim 2 wherein the processor is configured to rank stored finger biometric template nodes, and replace in the memory a stored biometric template node having a lower ranking with a new finger biometric template node having a higher ranking.

5. The electronic device according to claim 4 wherein the processor is configured to rank based upon at least one of a specific finger area, node age, frequency of node usage, and frequency of associated finger biometric template usage.

6. The electronic device according to claim 4 wherein the processor is configured to store at least one newer finger biometric template node for each finger.

7. The electronic device according to claim 1 wherein the processor is configured to determine the second number of finger biometric template nodes based upon at least one of a finger size, a finger positional variability, and a finger frequency of usage.

8. The electronic device according to claim 1 further comprising at least one wireless transceiver coupled to the processor.

9. An electronic device comprising:

at least one wireless transceiver;

a finger biometric sensor;

a memory; and a processor coupled to the at least one wireless transceiver, finger biometric sensor, and memory and being configured to generate a respective finger biometric template node for each finger positioning adjacent the finger biometric sensor, allocate a set space of the memory to store a total number of finger biometric template nodes based upon a first number of fingers and with each finger having a first number of finger biometric template nodes associated therewith, reallocate the set space of the memory to store the total number of finger biometric template nodes but with a second number of finger biometric template nodes associated with at least one finger, the second number of finger biometric template nodes being different than the first number of finger biometric template nodes, store the finger biometric template nodes based upon the reallocating, and perform a finger match operation based upon the stored finger biometric template nodes.

10. The electronic device according to claim 9 wherein the processor is configured to rank stored finger biometric template nodes, and replace in the memory a stored biometric template node having a lower ranking with a new finger biometric template node having a higher ranking.

11. The electronic device according to claim 10 wherein the processor is configured to rank based upon at least one of a specific finger area, node age, frequency of node usage, and frequency of associated finger biometric template usage.

12. The electronic device according to claim 10 wherein the processor is configured to store at least one newer finger biometric template node for each finger.

13. The electronic device according to claim 9 wherein the processor is configured to store the second number of finger biometric template nodes based upon at least one of a finger size, a finger positional variability, and a finger frequency of usage.

14. A method for finger biometric processing in an electronic device comprising a finger biometric sensor, the method comprising:

operating a processor and associated memory of the electronic device for generating a respective finger biometric template node for each finger positioning adjacent the finger biometric sensor, allocating a set space of the memory to store a total number of finger biometric template nodes based upon a first number of fingers and with each finger having a first number of finger biometric template nodes associated therewith, and reallocating the set space of the memory to store the total number of finger biometric template nodes but with a second number of finger biometric template nodes associated with at least one finger, the second number of finger biometric template nodes being different than the first number of finger biometric template nodes.

15. The method according to claim 14 further comprising operating the processor and associated memory for storing the finger biometric template nodes based upon the reallocating.

16. The method according to claim 15 further comprising operating the processor and associated memory for performing a finger match operation based upon the stored finger biometric template nodes.

17. The method according to claim 15 further comprising operating the processor and associated memory for ranking stored finger biometric template nodes, and replacing in the memory a stored biometric template node having a lower ranking with a new finger biometric template node having a higher ranking.

18. The method according to claim 17 further comprising operating the processor and associated memory for ranking based upon at least one of a specific finger area, node age, frequency of node usage, and frequency of associated finger biometric template usage.

19. The method according to claim 17 further comprising operating the processor and associated memory for storing at least one newer finger biometric template node for each finger.

20. The method according to claim 14 further comprising operating the processor and associated memory for determining the second number of finger biometric template nodes based upon at least one of a finger size, a finger positional variability, and a finger frequency of usage.

21. A non-transitory computer readable medium for use with a finger biometric sensor and which when executed on a processor having an associated memory performs steps comprising:

generating a respective finger biometric template node for each finger positioning adjacent the finger biometric sensor;

allocating a set space of the memory to store a total number of finger biometric template nodes based upon a first number of fingers and with each finger having a first number of finger biometric template nodes associated therewith; and reallocating the set space of the memory to store the total number of finger biometric template nodes but with a second number of finger biometric template nodes associated with at least one finger, the second number of finger biometric template nodes being different than the first number of finger biometric template nodes.

22. The non-transitory computer readable medium according to claim 21 further comprising storing the finger biometric template nodes based upon the reallocating.

23. The non-transitory computer readable medium according to claim 22 further comprising performing a finger match operation based upon the stored finger biometric template nodes.

24. The non-transitory computer readable medium according to claim 22 further comprising ranking stored finger biometric template nodes, and replacing in the memory a stored biometric template node having a lower ranking with a new finger biometric template node having a higher ranking.

25. The non-transitory computer readable medium according to claim 24 further comprising ranking based upon at least one of a specific finger area, node age, frequency of node usage, and frequency of associated finger biometric template usage.

26. The non-transitory computer readable medium according to claim 24 further comprising storing at least one newer finger biometric template node for each finger.

27. The non-transitory computer readable medium according to claim 21 further comprising determining the second number of finger biometric template nodes based upon at least one of a finger size, a finger positional variability, and a finger frequency of usage.

* * * * *